United States Patent [19]
Mergard

[11] Patent Number: 6,009,489
[45] Date of Patent: Dec. 28, 1999

[54] METHOD AND SYSTEM FOR SUPPORTING NON-DETERMINISTIC BURST LENGTHS IN A MEMORY SYSTEM EMPLOYING EXTENDED DATA OUT(EDO)DRAM

[75] Inventor: James Oliver Mergard, Pflugerville, Tex.

[73] Assignee: Advanced Micro Devices, Inc., Sunnyvale, Calif.

[21] Appl. No.: 08/818,235

[22] Filed: Mar. 14, 1997

[51] Int. Cl.[6] ................................................. G06F 12/00
[52] U.S. Cl. .............................. 710/107; 710/102; 711/5; 711/158; 711/167; 711/168; 711/105
[58] Field of Search ................................ 395/287; 711/5, 711/158, 167, 168, 105

[56] References Cited

U.S. PATENT DOCUMENTS

| | | | |
|---|---|---|---|
| 5,559,753 | 9/1996 | Kocis | 365/236 |
| 5,623,638 | 4/1997 | Andrade | 395/494 |
| 5,696,923 | 12/1997 | Robertson et al. | 711/202 |
| 5,696,924 | 12/1997 | Robertson et al. | 711/202 |
| 5,717,654 | 2/1998 | Manning | 365/233.5 |
| 5,729,503 | 3/1998 | Manning | 365/233.5 |
| 5,732,236 | 3/1998 | Nguyen et al. | 395/405 |
| 5,805,854 | 9/1998 | Shigeeda | 395/401 |

OTHER PUBLICATIONS

EDO Applications Note from Micron entitled, "Reduce DRAM Cycle Times with Extended Data-Out," Publication Date Nov. 1992, pp. 5–8.

*Primary Examiner*—Ayaz R. Sheikh
*Assistant Examiner*—Eric S. Thlang
*Attorney, Agent, or Firm*—Conley, Rose & Tayon; Robert C. Kowert

[57] ABSTRACT

A method and system is provided for avoiding data bus contention between EDO DRAM banks during a burst cycle to a memory page crossing a memory bank boundary. Each memory bank has output drivers configured to selectively drive data on a common data bus. The disclosed method and system contemplate decoding memory addresses into bank select signals and comparing the bank select signals for the current memory cycle to the state of the bank select signals in the previous cycle. If the current access is to a different bank, then the cycle is delayed and a disable signal is pulsed active to the EDO DRAM, disabling the output drivers. The memory page is kept open in the memory banks to allow bursts across bank boundaries. The current cycle is then allowed to continue to completion and data bus contention is avoiding while crossing the bank boundary.

16 Claims, 6 Drawing Sheets

METHOD AND SYSTEM FOR SUPPORTING NON-DETERMINISTIC BURST LENGTHS IN A MEMORY SYSTEM EMPLOYING EXTENDED DATA OUT(EDO)DRAM

BACKGROUND OF THE INVENTION

1. Field of the Invention

This invention relates to a computer system and, more particularly, to a memory subsystem within the computer system employing extended data out (EDO) dynamic random access memory (DRAM). Even more specifically, this invention relates to the prevention of bus contention between EDO DRAM banks during burst accesses having a non-deterministic length.

2. Description of the Relevant Art

Modern computer systems often employ extended data out (EDO) dynamic random access memory (DRAM) in order to obtain faster memory cycle times. The basic operation of EDO DRAM devices and the addressing of such devices by row address strobe (RAS) signals and column address strobe (CAS) signals and the design of controllers for such devices, is generally understood in the art of memory control/access and, for sake of brevity, need not be repeated.

EDO DRAM continues to drive the addressed data on its data lines after CAS is unasserted. This extended output drive allows the device(s) accessing the memory to latch the data during the CAS precharge time of the next memory cycle, resulting in a shorter cycle time. Multiple banks of memory are desirable for improved capacity and performance. However, if multiple banks of EDO DRAM are employed, a data bus contention problem may arise when memory accesses switch from one bank to another during burst accesses. The contention problem arises because the previously selected EDO DRAM bank continues to drive the data bus. When the newly selected memory bank begins to drive data for the addressed location, both banks will be contending for, and driving, the bus.

Therefore, it is necessary to turn off the output drivers of the previously selected bank before the newly selected (current) bank begins to drive the data bus. Several solutions have been utilized to turn off the previously selected bank's output drivers to avoid contention.

One such solution is not to use EDO-type DRAM and instead employ a type of memory that does not continue to drive the bus, such as regular fast page mode DRAM. This solution has the disadvantage of losing the performance benefits of EDO DRAM.

Another solution is to use the output enable (OE) pin for the EDO DRAM to turn off the output drivers when switching to a new bank. However, the OE pin is normally not required for use in normal operation, and thus is usually not driven by the memory controller device. The OE pin on each EDO DRAM is usually hardwired to an enabled state. Therefore, to employ this solution, extra pins would need to be added to the memory controller device to drive the OE pins of the EDO DRAM for each separate memory bank. However, extra pins may not be available to the memory controller. At the very least, it is expensive to support the extra pins needed to drive the OE signals. Therefore, it is desirable to have a solution that turns off the EDO DRAM output drivers by using signals already in use, thus avoiding the addition of more pins to the memory controller.

Another solution is to only access the system memory with burst cycles that always end on a bank boundary. When the burst cycle ends on a bank boundary, both RAS and CAS are unasserted to that memory bank. The EDO DRAM output drivers turn off when both RAS and CAS are unasserted. However, it may be advantageous to employ burst cycles of a non-deterministic length. If the burst length is non-deterministic, then it cannot be guaranteed that the burst will end on a bank boundary.

An example of a system employing non-deterministic burst lengths is a system in which a central processing unit (CPU) and a graphics controller both access memory in a shared memory architecture. The graphics controller may have an internal first-in first-out (FIFO) storage to maintain the screen image without interruption when the CPU is accessing system memory. When the graphics controller obtains access to system memory, it will perform a burst access cycle to fill its FIFO. The length of the burst required to fill the FIFO will vary depending on system operation. Limiting the FIFO to bursts of determined length may result in the graphics controller being "starved" for memory. Thus, it is desirable to employ a non-deterministic burst length to optimize graphics controller accesses. It is easily understood that other types of devices and architectures could benefit from non-deterministic burst lengths.

Therefore, it is desirable to have a memory system that employs EDO DRAM in multiple banks, but avoids data contention when switching between banks. For improved performance, it is also desirable to leave the memory page open (not deassert RAS) when switching banks so that page hits may continue. It is further desirable to avoid data contention without requiring additional control signals to the memory controller device. Furthermore, it is desirable for such a system to support burst accesses of a non-deterministic length to memory.

SUMMARY OF THE INVENTION

The problems outlined above are in large part solved by a computer memory system in accordance with the present invention. Broadly speaking, the present invention contemplates a computer system employing EDO DRAM and capable of supporting memory burst accesses across memory bank boundaries while avoiding data bus contention.

The invention provides a memory system with a plurality of memory banks employing EDO DRAM. The memory banks are controlled by a memory controller device. The memory controller device supplies the necessary control signals to the memory such as RAS, CAS, and memory write enable (MWE). The memory controller includes logic to generate bank select signals indicating which memory bank is selected for the current access cycle. The memory controller further includes comparison logic that compares the bank select signals for the current access cycle to the bank select signals from the previous access cycle. When a different bank is accessed in the current cycle than was accessed in the previous cycle, the comparison logic asserts a bank traversal signal.

The bank traversal signal is received by CAS controller logic within the memory controller. Delay logic in the CAS controller logic delays assertion of the appropriate CAS signal(s) when the bank traversal signal is asserted. The length of the delay may be programmably selected.

Disabling logic within the memory controller also receives the bank traversal signal and asserts a disable signal to turn off the output drivers of the previously selected memory bank. The invention contemplates the use of the memory write enable (MWE) signal for EDO DRAM wherein the MWE signal is pulsed active thereby turning off the EDO DRAM output drivers.

In one embodiment of the invention, the comparison logic may comprise logic for latching the bank select signals. The latched bank select signals store the state of the bank select signals for comparison in the next access cycle. The comparison logic preferably includes logic for comparing the current bank select signals to the latched bank select signals, and logic for generating the bank traversal signal when the comparison logic indicates access to a different bank.

The invention further contemplates a method for avoiding data bus contention between memory banks during a burst cycle to a memory page crossing a memory bank boundary. Each memory bank has output drivers configured to selectively drive data on a common data bus. The method includes decoding the address for the memory cycle into bank select signals indicating which memory bank is selected for the current access cycle. The bank select signals are then compared to the bank select signals from the previous access cycle and a bank traversal signal is asserted if a different bank is selected. If the same bank is selected then the access continues without delay.

When bank traversal is asserted, the access cycle is delayed and a disable signal is generated to disable the output drivers on the previously selected memory bank. However, the memory page is left open in the previous memory bank. The bank select signals are then latched for comparison in the next access cycle and the current cycle is completed. Data bus contention is avoided since the output drivers for the previously selected memory bank are disabled before the currently selected bank begins to drive data out.

BRIEF DESCRIPTION OF THE DRAWINGS

Other objects and advantages of the invention will become apparent upon reading the following detailed description and upon reference to the accompanying drawings in which.

Figure 1:
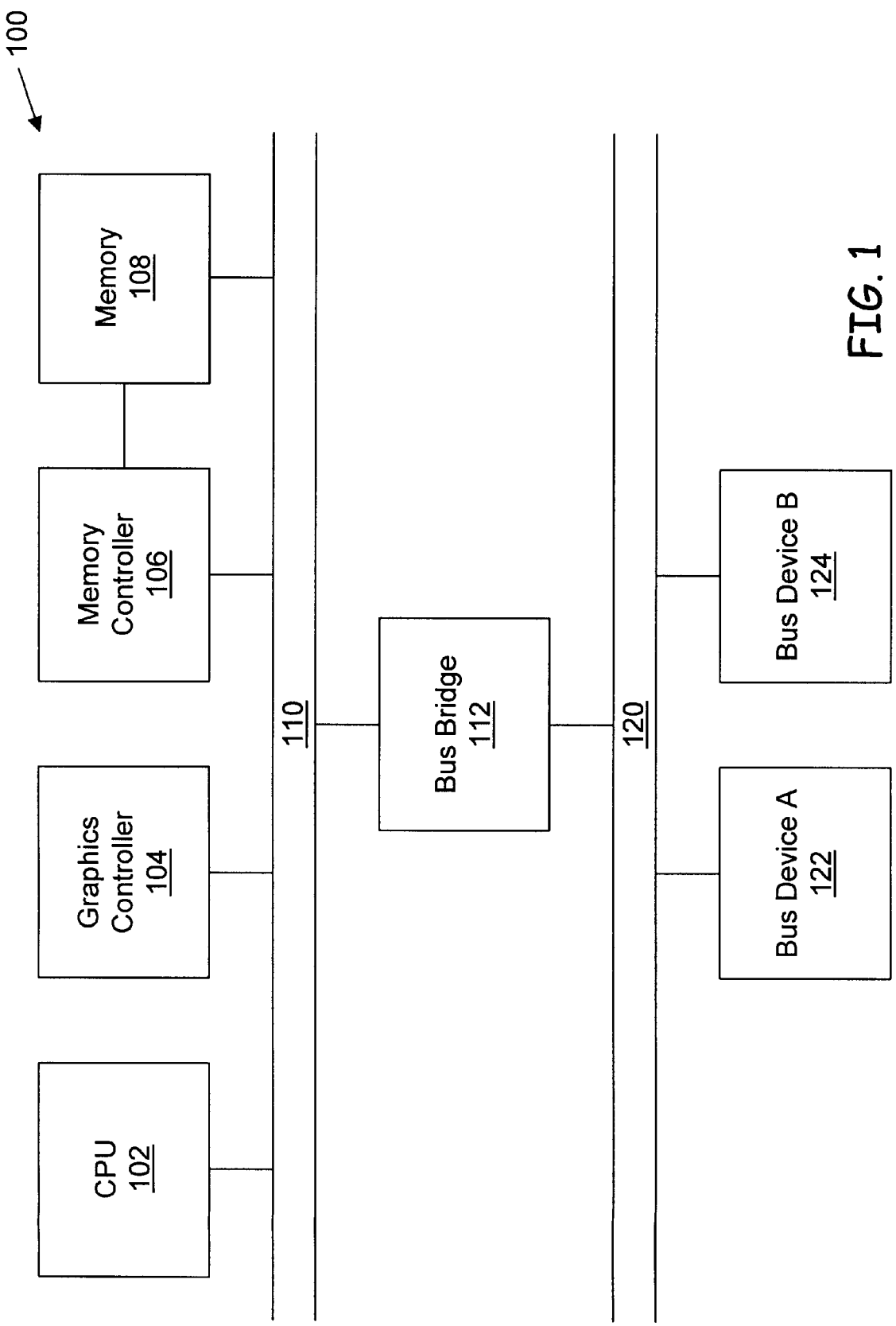
FIG. 1 is a block diagram of a computer system employing the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

FIG. 1 illustrates one embodiment of a computer system 100 into which the present invention may be employed. The computer system 100 comprises a central processing unit (CPU) 102, a graphics controller 104, a memory controller 106 coupled to system memory 108, and a bus bridge device 112. All of these recited devices are coupled to a system bus 110. One or any combination of the above recited devices may be included in a single integrated circuit device.

The bus bridge device 112 serves to interface the system bus 110 to a peripheral bus 120. Peripheral bus devices 122 and 124 are coupled to the peripheral bus 120.

The CPU 102 may be any CPU or microprocessor device used in various computer systems. Examples of suitable CPU devices to be employed for CPU 102 are Pentium® devices (or any X86 family CPU), PowerPC® devices, Alpha® processors, etc. CPU 102 may also include internal cache memory. CPU 102 is the main processing element of computer system 100. CPU 102 executes programs stored in memory 108 or other memory devices to perform functions as desired by the user. Computer system 100 and CPU 102 may run under any modern operating system such Windows®.

Graphics controller 104 functions to create images on an external monitor device (not shown in FIG. 1) to provide a visible user interface for computer system 100. Graphics controller 104 reads screen image data from graphics memory and converts the screen image data to signals suitable to display the screen image on the external monitor device. Graphics controller 104 may also manipulate the screen image data to perform various graphics functions such as rotating an image. CPU 102 also manipulates screen image data in graphics memory to update or change the screen image.

The graphics memory address space may be located in dedicated graphics memory within graphics controller 104. Alternatively, the graphics memory address space may be located within system memory 108. This arrangement where graphics memory is physically located within the system memory is referred to as a shared memory architecture. It is noted that the concepts of this invention may be applied to various memory architectures known in the art. Graphics controller 104 may include a first-in first-out (FIFO) memory for storing a sufficient amount of screen image data so that the screen image may be displayed and refreshed without interruption when graphics controller 104 does not have continuous access to system memory 108.

Memory controller 106 provides the necessary signals to access system memory 108. Memory controller 106 manages the addressing and control of memory 108. Memory 108 may comprise extended data out (EDO) dynamic random access memory (DRAM) devices. Memory 108 stores system and graphics data and supplies such data to CPU 102 and graphics controller 104 across system bus 110. System bus 110 comprises the necessary control, address, and data signals to provide for communication between the various system bus devices.

Bus bridge 112 interfaces system bus 110 to peripheral bus 120 to allow CPU 102 to communicate with peripheral bus devices 122 and 124 and to allow peripheral bus devices 122 and 124 access to memory 108. Bus bridge 112 may provide for direct memory access (DMA) between peripheral bus devices 122, 124 and system memory 108.

Peripheral bus 120 may be implemented according to a bus standard such as the Peripheral Component Interconnect (PCI) standard, Industry Standard Architecture (ISA) standard, Extended Industry Standard Architecture (EISA) standard, VESA Local (VL) Bus standard, etc. While only two peripheral bus devices 122 and 124 are shown in FIG.

1, any number of peripheral bus devices may be employed with the present invention as allowed by the chosen peripheral bus standard. Peripheral bus devices 122 and 124 may be any such peripheral device typically found in a computer system such as a hard drive interface, CD ROM drive interface, parallel/serial ports, modem, printer interface, etc.

Figure 2:
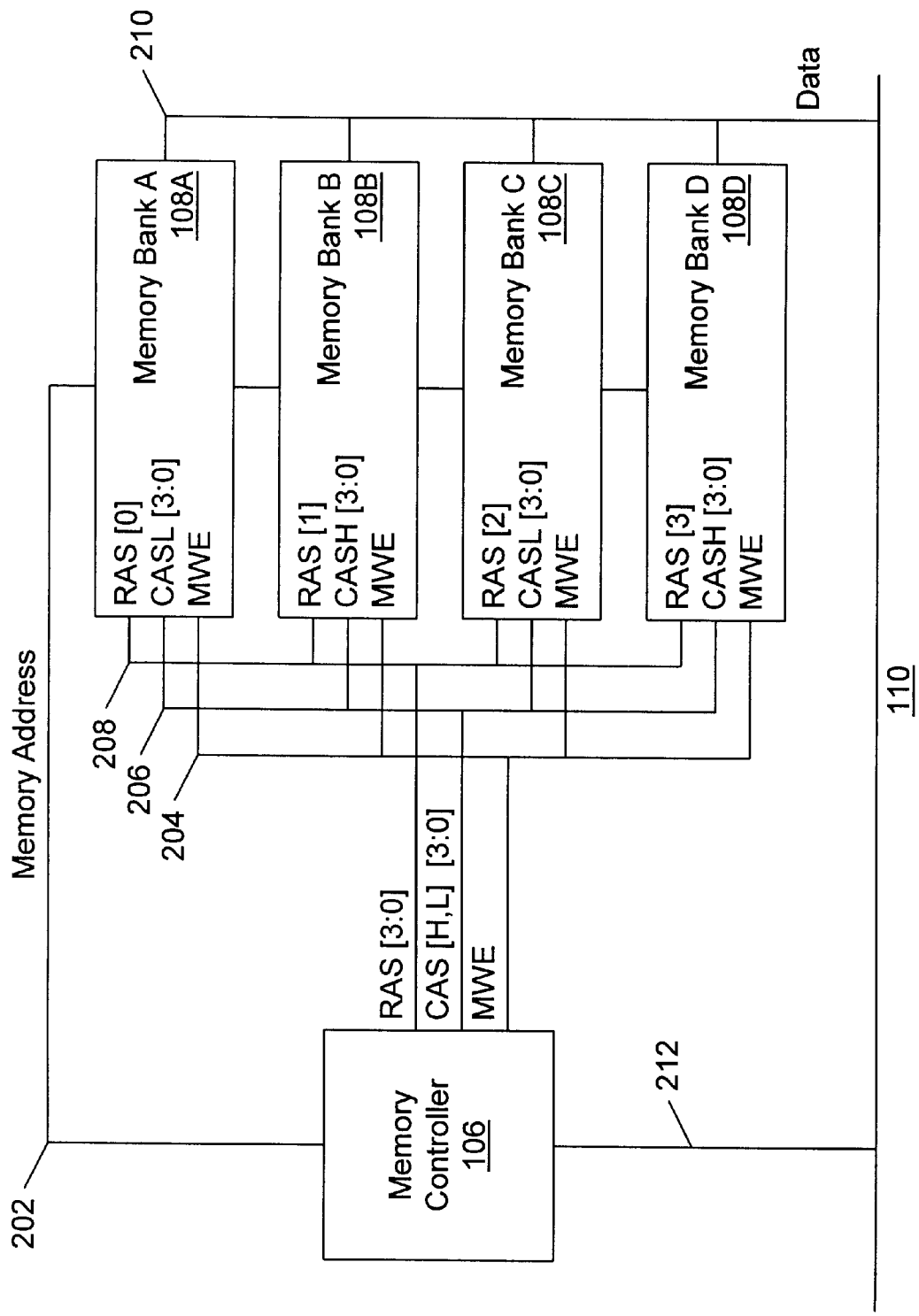
FIG. 2 is a block diagram of a memory subsystem employing the present invention.

Referring now to FIG. 2, a block diagram is shown of the memory subsystem of computer system 100 according to the present invention. Memory 108 is shown to comprise four banks of memory 108A–D. The data ports of memory banks 108A–D are coupled to system bus 110 as shown by data path 210. Memory banks 108A–D are controlled by memory controller 106. Memory controller 106 is coupled to the control and address signals of system bus 110 as shown by connection 212.

When memory controller 106 receives a memory access cycle from CPU 102 or graphics controller 104 across system bus 110, it decodes the cycle and converts the system bus address to the appropriate memory address for the system memory 108. The memory controller 106 determines which bank of memory 108 is being accessed and supplies the appropriate address through memory address signals 202. The memory address is supplied in two phases: a row address and a column address. A portion of the address is supplied on the memory address signals 202 and received by the appropriate memory bank(s) 108A–D by strobing one or more of the row address strobe (RAS) signals 208. This strobing of RAS 208 opens a memory page within one or more of the memory banks 108A–D. A memory page is an area within a memory bank corresponding in size to the column address. A memory location within a memory page is selected by memory controller 106 providing a column address on memory address signals 202 to memory 108 and strobing one of the column address strobe (CAS) signals 206 to the appropriate memory bank 108 A–D. The selected memory bank 108A–D then drives the data for the memory location addressed within the open memory page on the data signals 210 to the system bus 110. Write accesses are performed in a similar manner except data is supplied to the memory 108 and the memory write enable (MWE) signal 204 is asserted.

When subsequent memory accesses are to memory locations within the same memory page, only the column address need be provided to the appropriate memory bank 108A–D, thereby reducing access time. Thus, it is advantageous to keep a memory page open in multiple memory banks for as long as possible. When a memory cycle accesses a memory location within an open page, it is called a page hit. Page hit accesses may be performed in rapid succession by access cycles called bursts.

When burst accesses cross a memory bank boundary within the same buffer address space, a data bus contention problem may arise if EDO DRAM is employed in the memory banks 108A–D. Bus contention may occur because the output drivers for EDO DRAM continue to drive data out after the CAS signal is unasserted. This feature is advantageous in that it allows faster memory cycle times. However, when memory accesses cross a memory bank boundary and the memory page remains open in both banks, a bus contention problem arises since both banks will be driving the data bus. Therefore, it is desirable to turn off the output drivers of the previously selected memory bank while advantageously leaving the memory page open (RAS asserted). The present invention accomplishes this goal.

Figure 3:
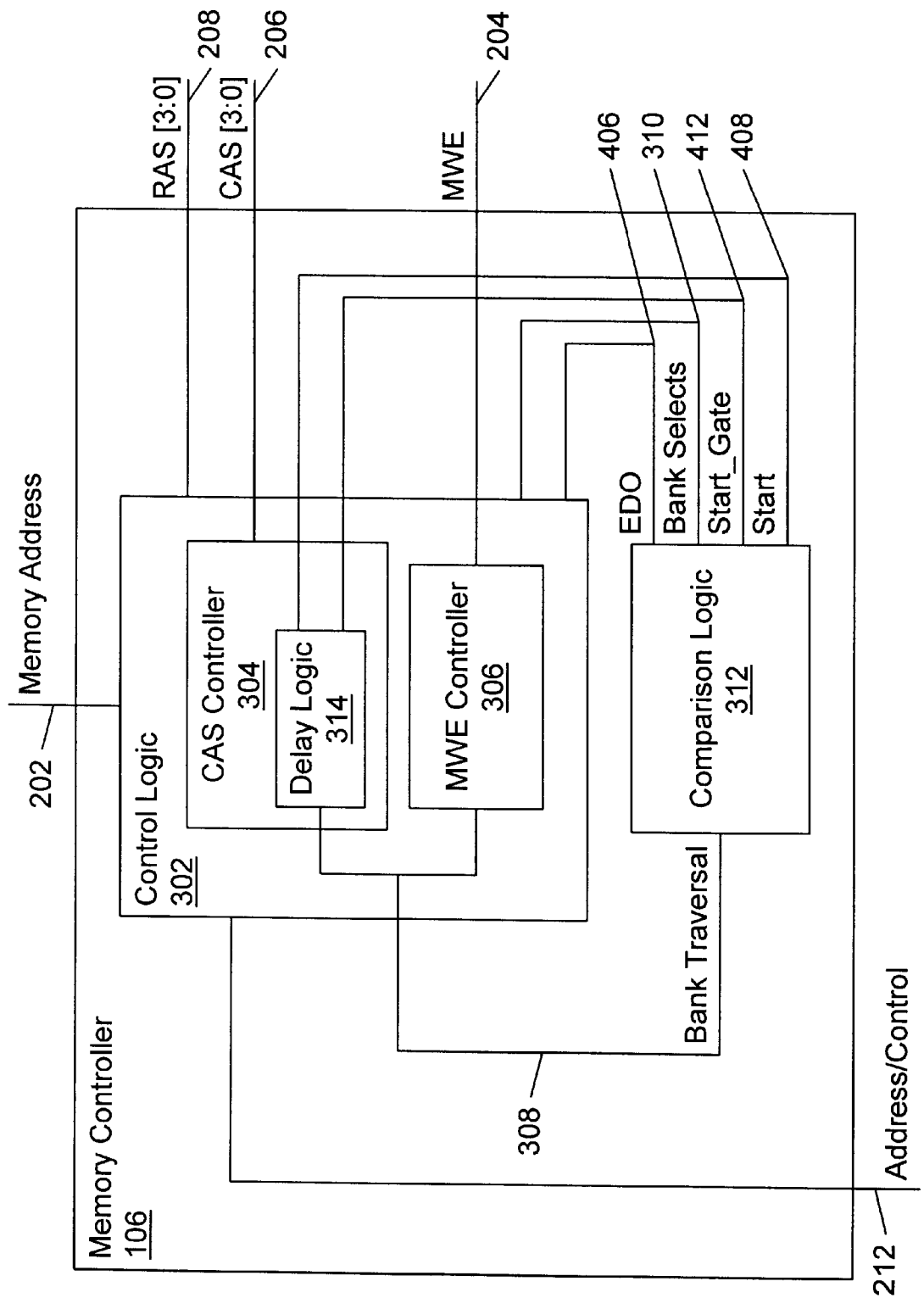
FIG. 3 is a block diagram of logic within a memory controller configured according to the present invention.

Referring now to FIG. 3, a block diagram is shown of circuitry within memory controller 106. FIG. 3 illustrates logic according to the present invention that prevents the aforedescribed bus contention problem while maintaining an open memory page in both the current and the previously selected memory banks. The operation of this logic is described as follows.

When memory controller 106 decodes a memory access cycle, the system bus address and appropriate control signals are received by control logic 302 within memory controller 106. Control logic 302 comprises the required logic and state machines to provides the RAS signals 208, CAS signals 206 and MWE signal 204 to memory banks 108A–D. Control logic 302 also generates bank select signals 310 that indicate which one of memory banks 108A–D is selected for the current access.

Comparison logic 312 receives the bank select signals 310. Comparison logic 310 detects when a memory access has crossed a bank boundary. This condition is referred to as a bank traversal. A bank traversal occurs when the memory bank selected for the current access cycle is different from the memory bank selected for the immediately previous access cycle. Comparison logic 312 detects bank traversals by comparing the state of the bank select signals 310 for the current access cycle to the state of the bank select signals 310 from the immediately previous access cycle. When these states differ, comparison logic 312 asserts bank traversal signal 308.

Control logic 302 receives bank traversal signal 308. The bank traversal signal 308 is further received by CAS controller logic 304 and MWE controller logic 306 within control logic 302. CAS controller logic 304 controls the assertion of the CAS signals 206 to the memory banks 108A–D.

Delay logic 314 within CAS controller logic 304 receives bank traversal signal 308. When bank traversal signal 308 is asserted for the current access cycle, delay logic 314 delays the cycle by preventing the appropriate CAS signal 206 from being asserted for a period of time. The amount of time for which CAS assertion is delayed may be programmably selected within memory controller 106.

When MWE controller 306 detects an assertion of bank traversal signal 308, it causes the MWE signal 204 to be pulsed asserted then unasserted. The nature of the EDO DRAM comprising memory banks 108A–D is that when they detect an assertion of MWE signal 204, they turn off their output drivers.

Thus, when a bank traversal is detected by comparison logic 312, delay logic 314 will cause the assertion of CAS for the current cycle to be delayed and MWE controller logic 306 will cause the MWE signal 204 to be pulsed. During the time that delay logic 314 is causing the current cycle to be delayed, the newly selected (current) memory bank will not yet have begun to drive data bus 210. Also, the pulse assertion and unassertion of MWE signal 204 will cause the EDO DRAM output drivers to turn off for the previously selected memory bank. After the delay period, the current access cycle will resume with the assertion of CAS to the current memory bank and bus contention will be avoided. Furthermore, the current memory page will stay open (RAS asserted) within the previously selected memory bank so that a subsequent page hit may occur within that memory bank thereby having a shorter access time.

Figure 4:
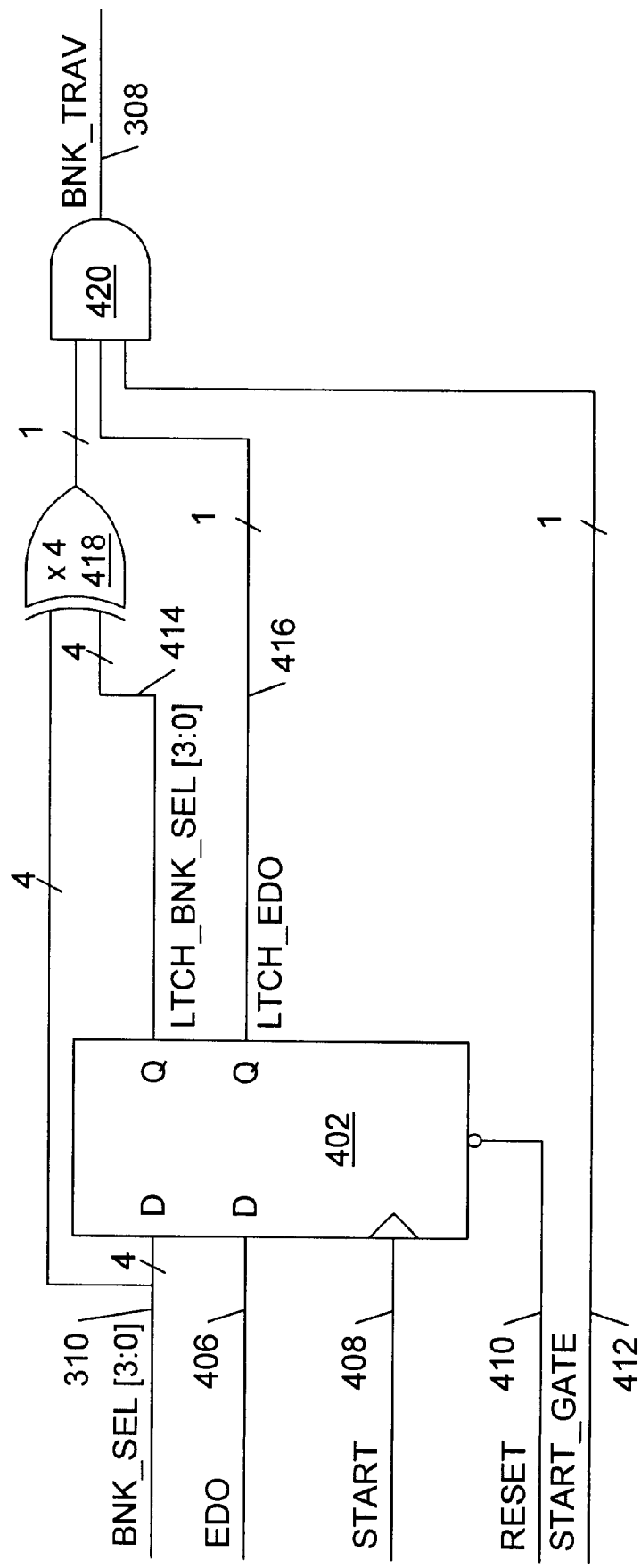
FIG. 4 is a schematic diagram of logic configured to generate a bank traversal signal according to the present invention.

Referring now to FIGS. 3 and 4 together, a schematic diagram is shown of comparison logic 312. A multiple-input D-type flip-flop 402 receives bank select signals 310 into one set of its D-inputs and EDO signal 406 into another D-input. The flip-flop 402 is clocked by start signal 408 and reset by reset signal 410. EDO signal 406 is generated within memory controller 106 and indicates if EDO DRAM is employed in the previously selected one of memory banks 108A–D. Start signal 408 is generated by state machine logic within control logic 302 and may be delayed by delay logic 314. Start signal 408 indicates the start of an access cycle to one of memory banks 108A–D. One set of Q-outputs of flip-flop 402 provide latched bank select signals 414 to an array of four exclusive OR gate array 418. The other inputs of exclusive OR gate array 418 receive bank select signals 310. AND gate 420 receives the output of the exclusive OR gate array 418. AND gate 420 also receives latched EDO signal 416 from the other Q-output of flip-flop 402. AND gate 420 further receives a start gate 412 signal generated by control logic 302. AND gate 420 outputs bank traverse signal 308.

Still Referring to FIGS. 3 and 4 together, at the beginning of a memory access, control logic 302 asserts bank select signals 310 to comparison logic 312. Bank select signals 310 comprise individual bank select signals corresponding to one of memory banks 108A–D. The state of the individual bank select signals for the immediately previous access cycle are stored for each bank by flip-flop 402 as latched bank select 414. Thus for each memory bank, the current bank select 310 is compared to the previous latched bank select 414 by exclusive OR gate array 418. If the state of the current bank select 310 is different from the state of the previous bank select 414, then exclusive OR gate array 418 asserts its output signal.

AND gate 420 asserts bank traverse signal 308 if exclusive OR gate array 418 detects a change in state of bank select 310, and latched EDO signal 416 indicates EDO DRAM is present in the previously selected bank, and start gate signal 412 is asserted. Start gate signal 412 is generated by delay logic 314 and functions to clear (unassert) bank traversal signal 308 after the delay period. When bank traversal signal 308 is unasserted, the access cycle continues and delay logic 314 asserts start signal 408 thereby latching bank select signals 310 into flip-flop 402.

Figure 5:
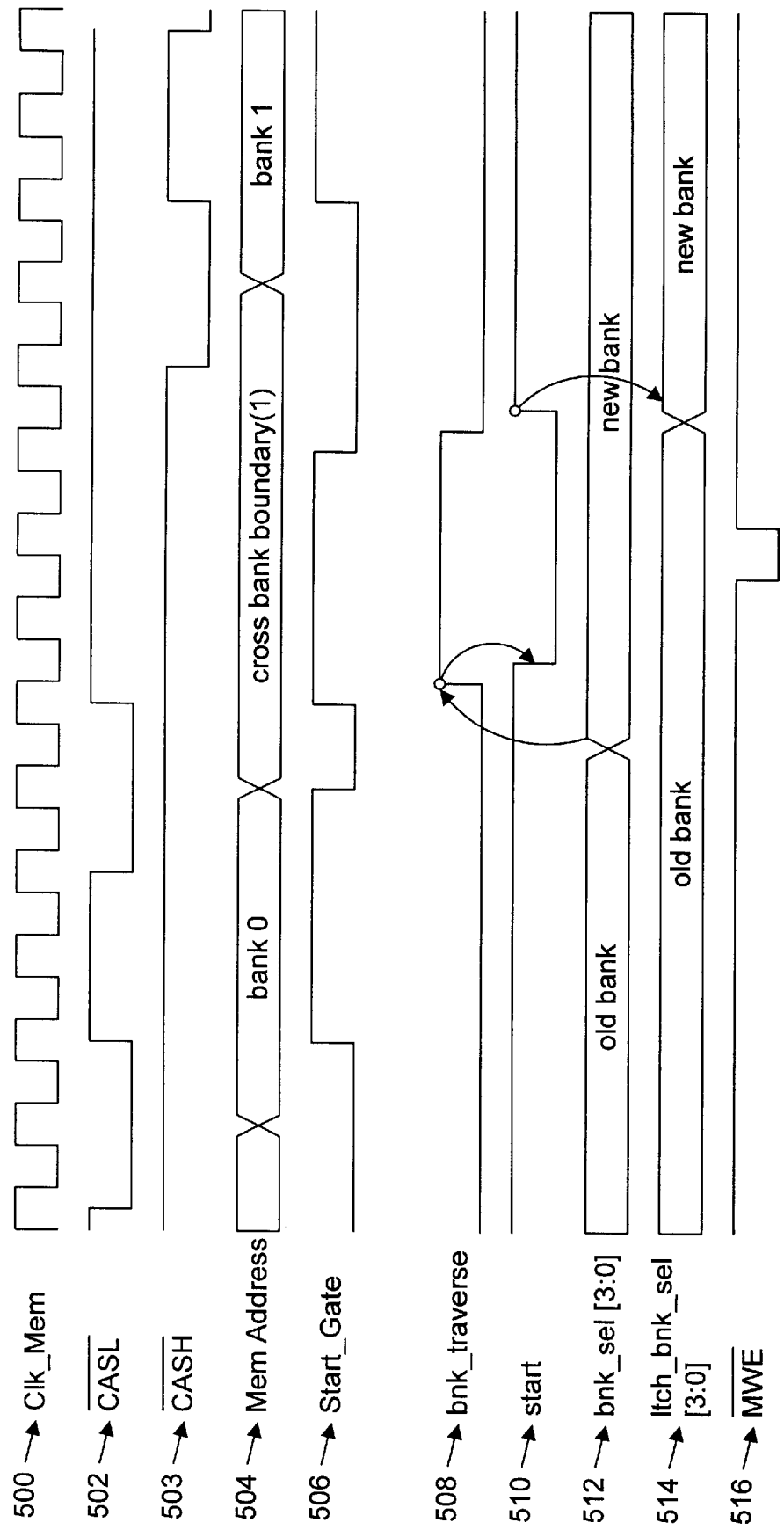
FIG. 5 is a timing diagram illustrating memory cycle timing for one embodiment of the present invention; and, FIG. 6 is a flow chart illustrating a control sequence according to the present invention.

Referring now to FIG. 5, a timing diagram is shown illustrating the operation of the logic shown in FIGS. 3 and 4. Time line 500 represents the internal clock to which many of the memory control signals are synchronized. Timelines 502 and 503 represent the state of the CAS signals 206 for the selected memory bank 108A–D. Note that CAS is shown in timelines 502 and 503 as an active low signal. Timeline 504 represents the address signals 212 for memory accesses. Timeline 506 represents the state of the start gate signal 412. Timeline 508 represents the state of the bank traversal signal 308. Timeline 510 represents the state of the start signal 408, active high. Timeline 512 represents the state of the bank select signals 310. Timeline 514 represents the state of latched bank select signals 414. And Timeline 516 represents the state of MWE signal 204 as an active low signal.

As illustrated by timelines 504 and 512, when the memory address begins to change from one bank to another, the bank select signals change to reflect the newly addressed memory bank. As shown on timeline 508, the change in the bank select signals 310 causes the bank traverse signal 308 to be asserted. The assertion of bank traversal signal 308 then causes delay logic 314 to unassert the start signal 408, as represented in timeline 510. Unassertion of start signal 408 delays the assertion of the CAS signal 206, as shown in timeline 503.

While CAS assertion is being delayed, MWE controller 306 causes the MWE signal 204 to be pulsed active, as shown in timeline 516, thereby turning off the output drivers for the EDO DRAM comprising the old (previously selected) memory bank. After the programmed delay period has elapsed, delay logic 314 unasserts the start gate signal 412, as shown in timeline 506, thereby causing the bank traversal signal 308 to be unasserted, as illustrated by timeline 508. In turn, the unassertion of bank traversal signal 308 causes the start signal 408 to be asserted thereby resuming the memory cycle and allowing CAS to be asserted, as illustrated by timelines 510 and 503. The assertion of start signal 408 also causes the state of bank select signals 310 to be latched to latched bank select signals 414 for comparison in the next memory access cycle, as represented in timeline 514.

Figure 6:
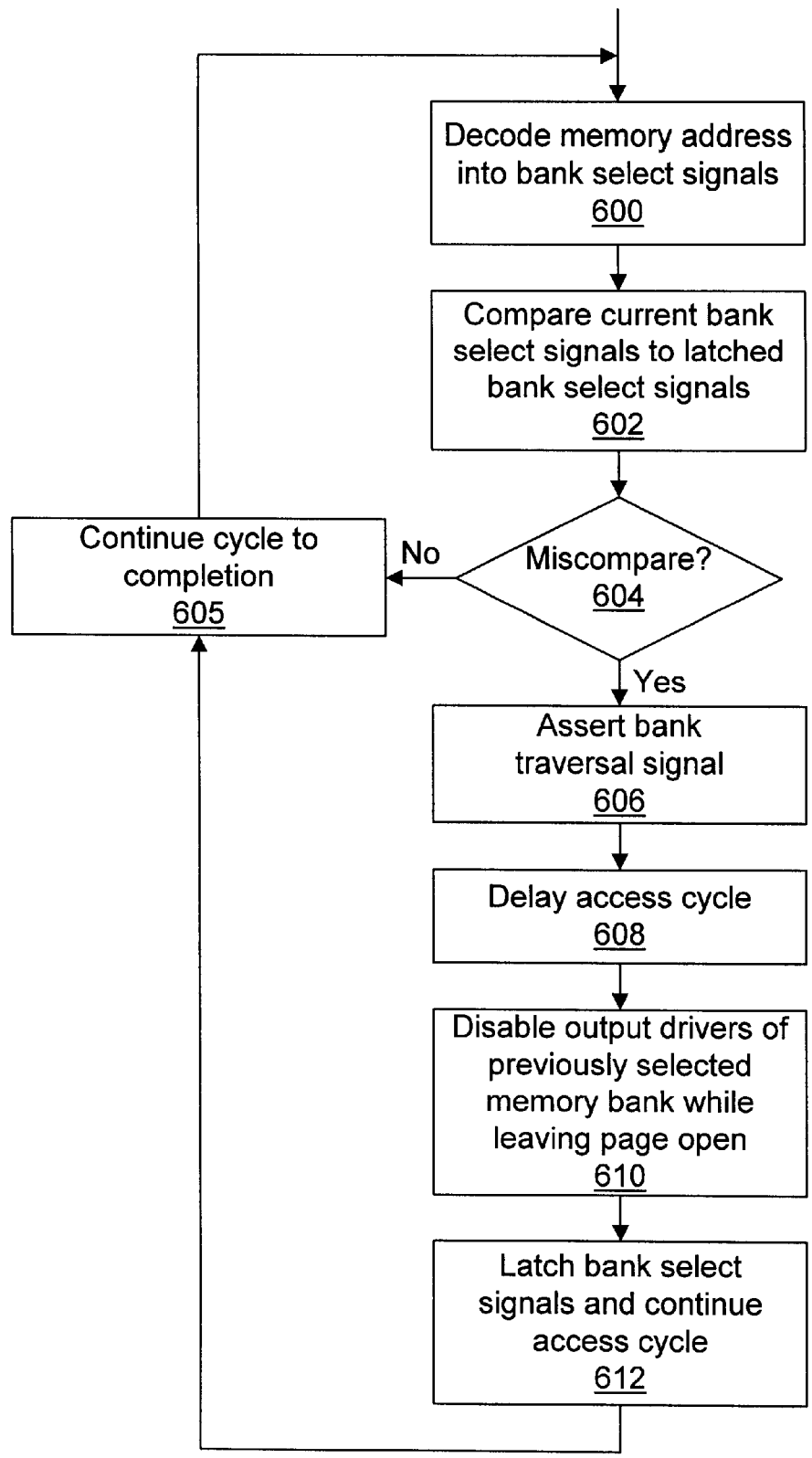

Referring now to FIG. 6, a flow chart is shown illustrating a method according to the present invention for avoiding data bus contention between memory banks during page hit burst accesses. First, the address for the new (current) memory cycle is decoded and bank select signals are asserted/unasserted to indicate the selected memory bank, as shown in step 600. Next, as shown in steps 602 and 604, the bank select signals are compared to latched bank select signals. The latched bank select signals indicate which memory bank was selected in the previous cycle. If the same memory bank was selected in the previous cycle as in the current cycle, then the cycle continues, as shown in step 605. If a different bank is selected, then a bank traversal signal is asserted, as represented by step 606. Assertion of the bank traversal signal leads to a delay in the access cycle, illustrated by step 608. During this delay, the output drivers of the previously selected memory bank are turned off while leaving the memory page open in the previously selected memory bank, as shown in step 610. Then the bank select signals are latched for comparison in the next cycle and the current cycle continues to completion. The process is repeated for each memory access.

Referring to the present invention in general, numerous variations and modifications will become apparent to those skilled in the art once the above disclosure is fully appreciated. For example, while FIG. 2 shows four memory banks, the invention may be applied to any number of multiple memory banks. Furthermore, the invention may be applied to unified as well as non-shared memory architectures. Also, the invention may be applied to other memory devices besides EDO DRAM that suffer similar bus contention problems. It is intended that the following claims be interpreted to embrace all such variations and modifications.

What is claimed is:

1. A method for avoiding data bus contention between a plurality of memory banks undergoing access cycles, wherein each memory bank has output drivers configured to selectively drive data on a common data bus, the method comprising:

detecting a bank traversal condition, which occurs when a memory bank of the plurality of memory banks selected for a current access cycle is different from another memory bank of the plurality of memory banks selected for an access cycle immediately preceding the current access cycle;

delaying continuation of the current access cycle upon detection of said bank traversal condition;

disabling the output drivers of the memory bank selected for the immediately previous access cycle while leaving the memory page open within the memory bank selected for the immediately previous access cycle; and continuing the current access cycle.

2. The method as recited in claim 1, wherein bank select signals indicate the currently selected memory bank, and wherein said detecting comprises:

comparing the bank select signals for the current access cycle to latched bank select signals;

generating a bank traversal condition if said comparing indicates that the current bank select signals differ from the latched bank select signals; and latching the bank select signals for each access cycle, wherein said latching creates the latched bank select signals.

3. The method as recited in claim 1, wherein each memory bank comprises Random Access Memory (RAM) addressed by supplying a column address and latching the column address into the RAM by asserting a Column Address Strobe (CAS) signal, wherein said delaying comprises:

receiving indication of said bank traversal condition; and delaying assertion of the CAS signal for a programmable amount of time upon said receiving.

4. The method as recited in claim 1, wherein said disabling comprises temporarily asserting a memory write enable signal to the memory bank selected for the immediately previous access cycle.

5. A circuit for avoiding data bus contention between a plurality of memory banks during a burst cycle to a memory page crossing a memory bank boundary, wherein each memory bank has output drivers configured to selectively drive data on a common data bus, the circuit comprising:

comparison logic configured to receive bank select signals indicating which memory bank is selected for the current access cycle, and said comparison logic configured to provide a bank traversal signal, wherein said bank traversal signal is asserted when said bank select signals indicate that a different memory bank is selected for the current access cycle than was selected for the immediately previous access cycle;

delay logic configured to receive said bank traversal signal and temporarily delay the continuance of the current access cycle when said bank traversal signal is asserted; and disabling logic configured to receive said bank traversal signal and assert a disable signal following assertion of said bank traversal signal, wherein the output drivers of the previously selected memory bank are disabled in response to assertion of said disable signal while leaving the memory page open within the previously selected memory bank.

6. The circuit as recited in claim 5, wherein said comparison logic comprises:

logic for latching the bank select signals for each access cycle, wherein said latching creates latched bank select signals;

logic for comparing the bank select signals for the current access to cycle to the latched bank select signals; and logic for generating said bank traversal signal if said comparing indicates that the current bank select signals differ from the latched bank select signals.

7. The circuit as recited in claim 5, wherein said disable signal comprises a memory write enable signal for the memory bank selected for the immediately previous access cycle.

8. The circuit as recited in claim 7, wherein said disabling logic asserts said disable signal by temporarily asserting said memory write enable signal.

9. A memory system supporting burst access cycles crossing a memory bank boundary, comprising:

a plurality of memory banks, wherein one of said plurality of memory banks is selected for each memory access cycle and wherein each memory bank has output drivers configured to selectively drive data on a common data bus;

a memory controller coupled to said memory banks, said memory controller comprising:

comparison logic configured to receive bank select signals indicating which memory bank is selected for the current access cycle, and said comparison logic configured to provide a bank traversal signal, wherein said bank traversal signal is asserted when said bank select signals indicate that a different memory bank is selected for the current access cycle than was selected for the immediately previous access cycle;

delay logic configured to receive said bank traversal signal and temporarily delay the continuance of the current access cycle when said bank traversal signal is asserted; and disabling logic configured to receive said bank traversal signal and assert a disable signal following assertion of said bank traversal signal, wherein the output drivers of the previously selected memory bank are disabled in response to assertion of said disable signal while leaving the memory page open within the previously selected memory bank.

10. The memory system as recited in claim 9, wherein said comparison logic comprises:

logic for latching the bank select signals for each access cycle, wherein said latching creates latched bank select signals;

logic for comparing the bank select signals for the current access to cycle to the latched bank select signals; and logic for generating said bank traversal signal if said comparing indicates that the current bank select signals differ from the latched bank select signals.

11. The memory system as recited in claim 9, wherein said disable signal comprises a memory write enable signal for the memory bank selected for the immediately previous access cycle.

12. The memory system as recited in claim 11, wherein said disabling logic asserts said disable signal by temporarily asserting said memory write enable signal.

13. The memory system as recited in claim 9, wherein said memory banks comprises Random Access Memory (RAM) addressed by supplying a column address and latching the column address into the RAM by asserting a Column Address Strobe (CAS) signal.

14. The memory system as recited in claim 13, wherein said memory controller further comprises CAS controller logic for generating at least one CAS signal for each memory bank, and wherein said CAS controller logic comprises said delay logic, and wherein said delay logic delays assertion of the CAS signal for the currently selected memory bank when said bank traversal signal is asserted.

15. The memory system as recited in claim 9, wherein said memory banks comprise Extended Data Out (EDO) Dynamic Random Access Memory.

16. The memory system as recited in claim 9, wherein the length that said delay logic delays continuance of the current access cycle is programmably selected within said memory controller.

\* \* \* \* \*